March 28, 1967 G. V. HALL 3,311,372
SHEET MATERIAL HANDLING APPARATUS
Filed April 15, 1965 4 Sheets-Sheet 1

INVENTOR
GARDNER V. HALL
BY
Rudolph L. Lowell
ATTORNEY

INVENTOR
GARDNER V. HALL
BY
ATTORNEY

March 28, 1967 G. V. HALL 3,311,372
SHEET MATERIAL HANDLING APPARATUS
Filed April 15, 1965 4 Sheets-Sheet 3

INVENTOR
GARDNER V. HALL
BY
*Rudolph L. Lowell*
ATTORNEY

March 28, 1967     G. V. HALL     3,311,372
SHEET MATERIAL HANDLING APPARATUS
Filed April 15, 1965     4 Sheets-Sheet 4

INVENTOR
GARDNER V. HALL
BY
ATTORNEY

United States Patent Office 3,311,372
Patented Mar. 28, 1967

---

3,311,372
SHEET MATERIAL HANDLING APPARATUS
Gardner V. Hall, Des Moines, Iowa, assignor to Pace Mfg. Co., Des Moines, Iowa, a corporation of Iowa
Filed Apr. 15, 1965, Ser. No. 448,309
4 Claims. (Cl. 271—74)

This invention relates generally to a sheet material handling apparatus and in particular to an apparatus for picking up printed sheet material from a screen printing press for delivery to a storage location.

An object of this invention is to provide an improved sheet material pickup apparatus for a screen printing press.

A further object of this invention is to provide a sheet pickup unit of vacuum-type movable by a continuous drive between a material pickup position and a material storage location wherein the pickup means is maintained stationary in the pickup position for a predetermined time interval relative to the continued movement of the drive therefor.

Still another object of this invention is to provide a sheet material pickup apparatus for a screen printing press wherein a vacuum pickup unit is movable into engagement with the sheet material in a path substantially normal to the plane of the sheet material.

A further object of this invention is to provide a sheet material pickup unit that is reciprocally moved in a horizonal path by a continuous chain, wherein the unit in a pickup position is retained against horizontal movement for a time period providing for the substantially vertical movement thereof into engagement with the sheet material to be handled thereby.

Still another object of this invention is to provide a sheet material pickup apparatus wherein the pickup unit of the apparatus is subjected to a vacuum pressure prior to and during its pickup function so as to assure a positive pickup action on the material to be handled.

Further objects, features and advantages of this invention will become apparent from the following description when taken in connection with the accompanying drawing in which.

Figure 1:
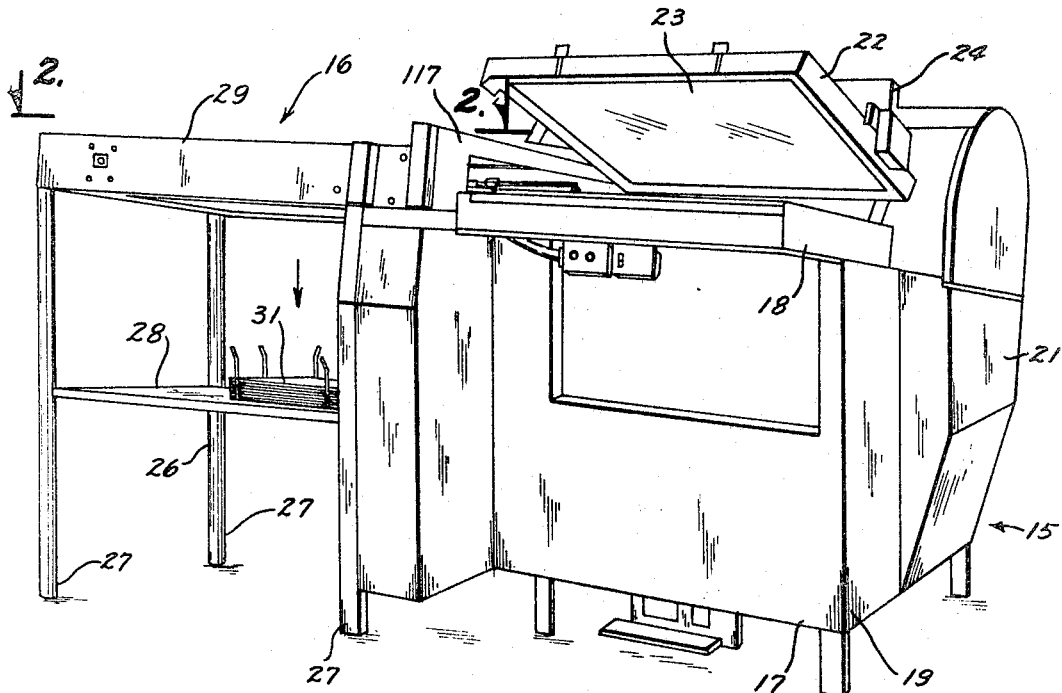
FIG. 1 is a perspective view showing the sheet material pickup apparatus of this invention in assembly relation with a screen printing machine.
Figure 2:
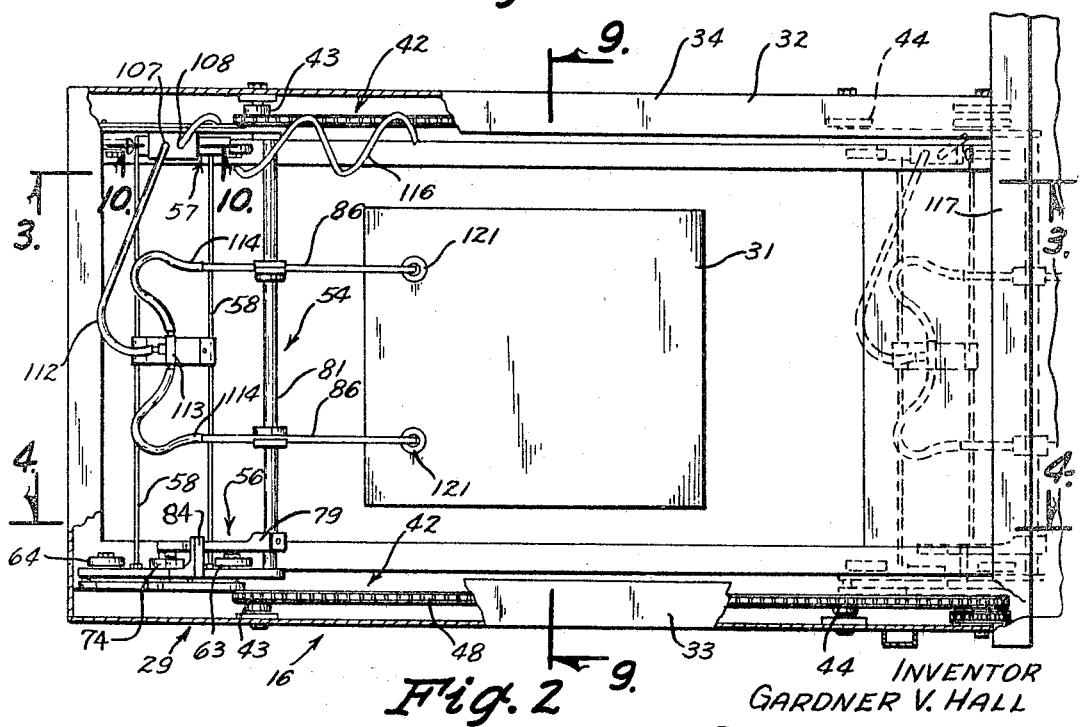
FIG. 2 is a top plan view of the assembly of FIG. 1 as seen along the line 2—2 with certain parts broken away and other parts shown in section for the purpose of clarity.
Figure 3:
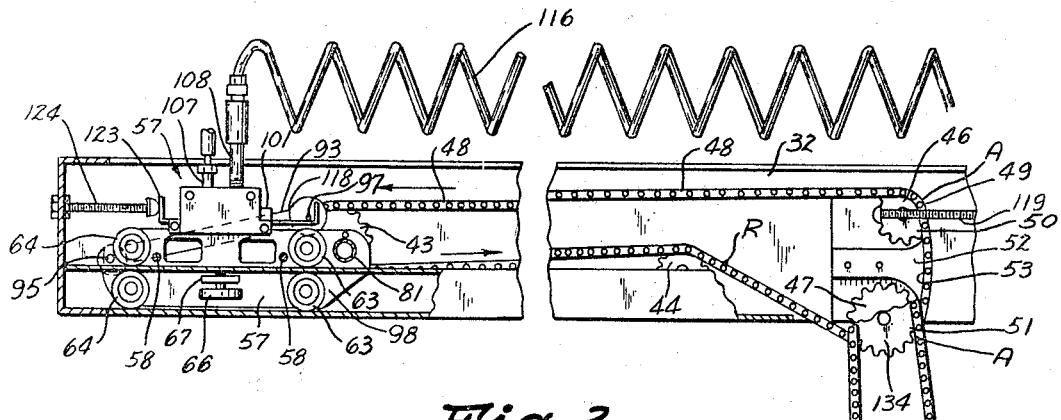
Figure 4:
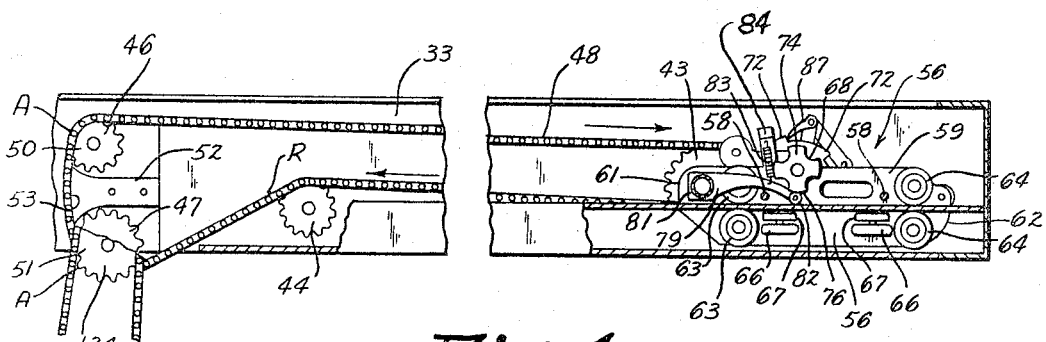
Figures 7, 8:
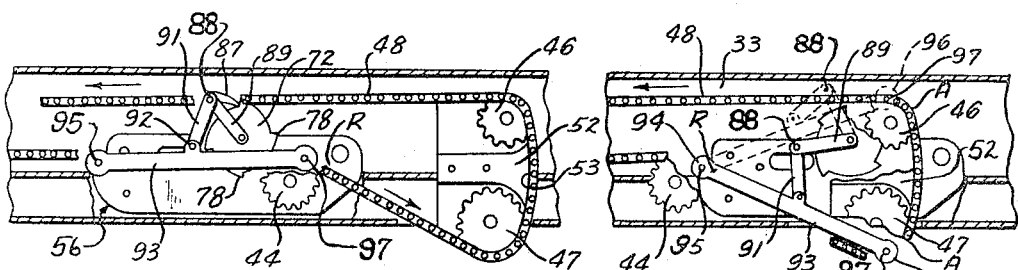
Figure 9:
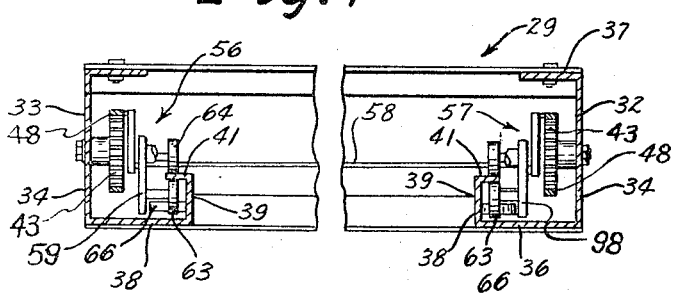
Figure 5:
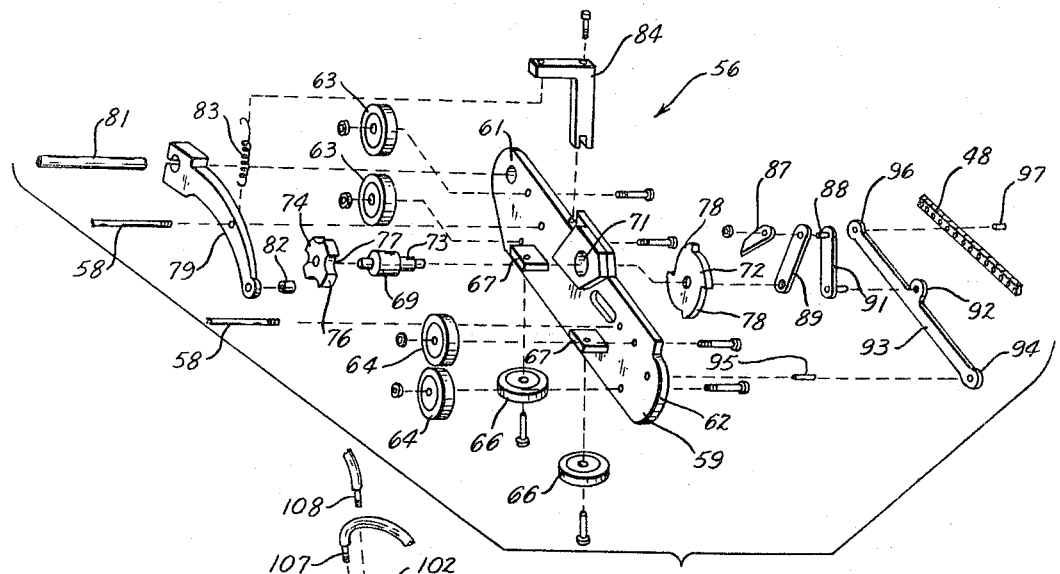
Figure 6:
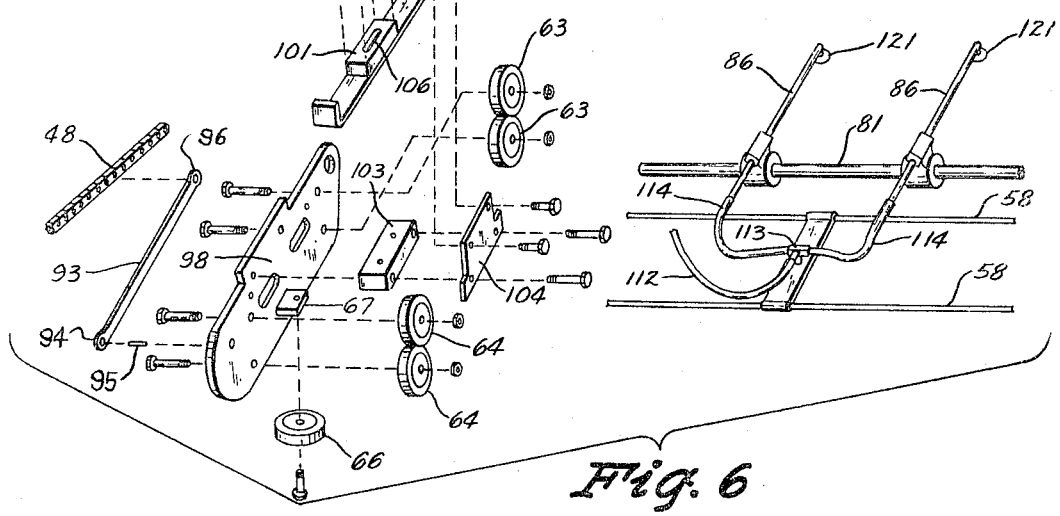
Figure 10:
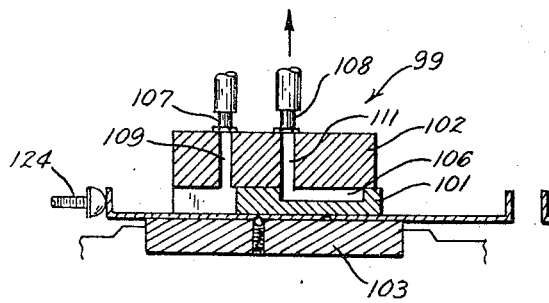
Figure 11:
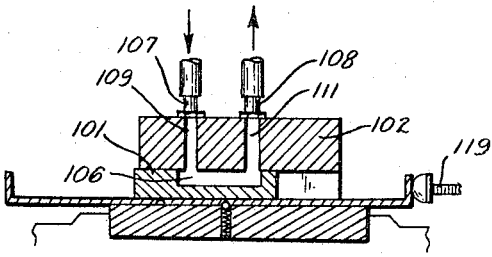
Figure 12:
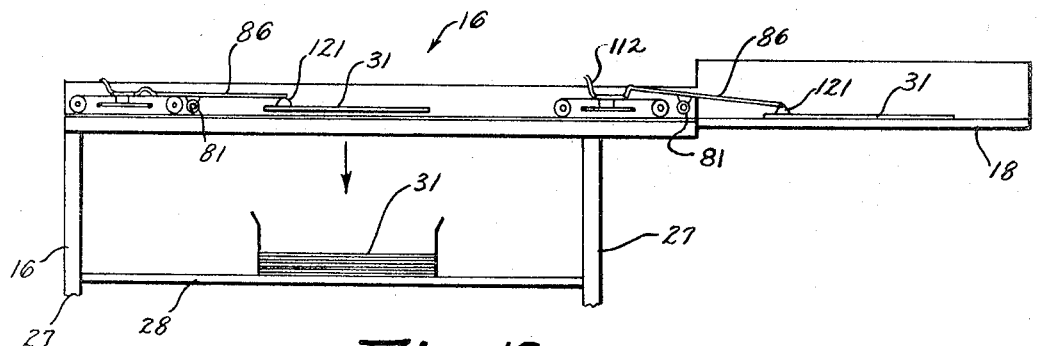
Figure 13:
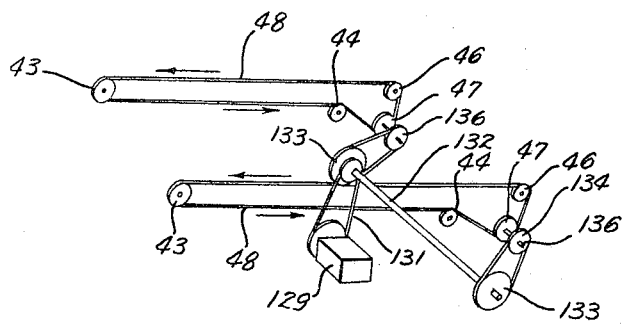

FIGS. 3 and 4 are enlarged foreshortened sectional views taken on the lines 3—3 and 4—4, respectively, in FIG. 2;

FIG. 5 is an exploded perspective view of the carriage unit, shown in FIG. 4, which forms part of the pickup apparatus;

FIG. 6 is an exploded perspective view of another carriage unit shown in FIG. 3 and which forms part of the pickup apparatus;

FIG. 7 is an elevational view of the carriage unit of FIG. 4 as seen from the side thereof opposite to that shown in FIG. 4;

FIG. 8 is illustrated similarly to FIG. 7 with the carriage unit parts shown in changed positions relative to their showing in FIG. 7;

FIG. 9 is a foreshortened sectional view taken on the line 9—9 of FIG. 2;

FIG. 10 is an enlarged sectional detail view taken along the line 10—10 in FIG. 2 showing the valve mechanism for controlling the supply of suction pressure to the pickup unit;

FIG. 11 is illustrated similarly to FIG. 10 and shows the parts thereof in changed positions;

FIG. 12 is a schematic front elevational view of the printing press and pickup apparatus assembly of FIG. 1 showing the pickup unit in a material pickup position; and FIG. 13 is a diagrammatic perspective view of the power transmission system for the pickup apparatus.

With reference to the drawing there is shown in FIG. 1 a silk screen printing machine indicated generally as 15 in assembly relation with the material pickup apparatus of this invention which is generally designated as 16. The machine 15 is of the type described in Patent No. 2,936,705 and includes a main frame 17, and a bed frame 18 for holding a sheet material which is to be printed. The end 19 of the main frame 17 is the front end of the machine 15. Pivotally supported on a shaft (not shown) and arranged transversely of the bed frame 18 is a screen supporting frame or chase 22 which extends forwardly from the shaft which is carried at the rear end 21 of the machine. The chase 22 is illustrated as supporting therein a silk screen 23. A squeegee supporting frame 24 is movably mounted on the chase 22 for back and forth movement thereon, and across the screen 23 during a silk screen printing operation.

The pickup apparatus 16 of this invention includes a frame structure 26 extended laterally from one side of the bed frame 18. The frame structure 26 has four supporting legs 27 (three of which are illustrated in FIG. 1) and an intermediate platform 28 secured to and positioned between the legs 27. An upper frame assembly 29, of an open rectangular shape, is supported on and secured to the upper ends of the legs 27. The intermediate platform 28 constitutes a storage or receiving station for the printed sheet material 31 which has been picked up and removed from the machine 15.

With reference to FIGS. 2 and 9 it is seen that the upper frame assembly 29 includes a pair of like side frame members 32 and 33 each of which is of a substantially channel-shape in transverse cross section. The members 32 and 33 are faced toward each other. The members 32 and 33, as shown in FIG. 9, have their base sections 34 in upright positions and lower horizontal legs 36 which are wider than the upper horizontal legs 37 and terminate in substantially J-shape extensions 38. Each extension 38 constitutes a track or guide unit comprised of an upright member 39 and a horizontal member 41 which extends laterally from the upper end of the member 39 toward the base section 34 of a corresponding side member 32 and 33.

Carried on the base sections 34 are like chain and sprocket assemblies, indicated generally at 42, and each of which is comprised of a set of sprocket gears 43, 44, 46 and 47 in operative association with a corresponding endless sprocket chain 48. As shown in FIG. 2 the corresponding gears 43, 44, 46 and 47 in each set of gears carried on a side member 32 and 33 are in axial alignment transversely of the frame structure 26.

The gears 43 (FIGS. 3 and 4) are located at the end of the frame structure 26 remote from the machine 15 and such remote end of the frame structure 26 will hereinafter be referred to as its outer end 49. Each pair of gears 46 and 47 at the inner end of the frame structure 26 are arranged in a vertically spaced relation with the gear 46 being above the gear 47. Each gear 44 is spaced from a corresponding pair of gears 46 and 47 at a location substantially between the gears 46 and 47 so that the axes of the corresponding gears 44, 46 and 47 on a corresponding side member 32 and 33 define a triangle having an apex at the gear 44. Likewise a sprocket chain 48 is trained about the gears 43, 46 and 47 and over the top side of what might be termed the intermediate gear 44.

As clearly appears in FIGS. 3 and 4 the portions 50 and 51 of each pair of gears 46 and 47, respectively, lie in a substantially common vertical plane. Positioned between each pair of gears 46 and 47 and secured to a corresponding side member 32 and 33 is a guide block 52 having an arcuate guide track 53 adapted for bearing engagement with a corresponding chain 48. The arc of that portion of a chain 48 extended between the points A—A in FIGS. 3 and 4 has a radius centered at R for a purpose to appear later. Importantly a chain 48 in its travel between the point A—A follows a circular arc, defined by a corresponding pair of gears 46 and 47 and guide track 53, having its radius of generation at R.

It will further be seen that each chain 48 by virtue of its relative assembly with a corresponding set of gears 43, 44, 46 and 47 has the upper and lower lengths thereof extended in substantially parallel paths between the gears 43, 44 and with the upper length of a chain being linearly extended between the gears 43 and 46.

The chain and sprocket assemblies 42 are operatively associated in a driving relation with a pickup unit (FIG. 2), indicated generally at 54, which includes a pair of carriage assemblies 56 and 57 movably supported on the side members 33 and 32, respectively, in alignment transversely of the frame structure 26. The carriage assemblies 56 and 57 are connected together for movement as a unit longitudinally of the frame structure by connecting or tie rods 58.

The carriage assembly 56 (FIGS. 4 and 5), which will hereinafter be referred to as the trip carriage, is comprised of a flat elongated upright body member 59 of a generally rectangular shape formed with rounded end portions 61 and 62. Rotatably supported adjacent each end portion 61 and 62 are corresponding pairs of guide rollers 63 and 64. All of the rollers 63 and 64 are rotatable in a common vertical plane and with the rollers of each pair being in a vertically spaced relation. Intermediate the pairs of rollers 63 and 64 is a pair of rollers 66 each of which is rotatably supported on a corresponding lateral projection 67 secured to the body member 59.

As shown in FIG. 9 the rollers 63 and 64 are adapted for rolling engagement with opposite sides of the horizontal guide member 41 while the rollers 66 are in rolling engagement with the upright guide member 39. The carriage assembly 56 is thus supported against relative tipping movement on the track or guide members 39 and 41 and is retained in a movably supported position by virtue of its connection through the tie rods 58 with the carriage assembly 57.

Rotatably supported for rotation about an axis extended transversely of the body member 59 and at a position between the rollers 63 and 64 is a combination ratchet and cam unit 68 (FIGS. 4 and 5). This unit includes a stepped shaft 69 rotatably supported in a bearing 71 in the body member 59 and having a ratchet 72 mounted on the shaft end 73 which is adjacent to the wall 34 of the side member 33. A cam 74 carried on the opposite end of the shaft 73 is peripherally formed with cam surfaces 76 that are spaced equal distances apart by notches or low cam surfaces 77. As best shown in FIG. 5 the ratchet 72 has four teeth 78 corresponding in number to the cam surfaces 76 and notches 77 so that on rotation of the ratchet 72 through an angular distance of one tooth 78 the cam 74 is rotated through an angular distance equal to one cam surface 76 and one notch 77. In other words the circumferential length or pitch of a tooth 78 is equal to the combined circumferential length of a cam surface 76 and notch 77.

The cam 74 (FIG. 2) is operatively associated with a trip or actuating arm 79 mounted on a shaft 81 extended between and rotatably supported on the carriage assemblies 56 and 57. The free end of the arm 79 (FIGS. 4 and 5) rotatably supports a cam roller 82 which is in rolling engagement with the peripheral surface of the cam 74. In response to the rotation of the cam 74 through an angular distance equal to the pitch of a ratchet tooth 78 the arm 79 is tripped through one complete cycle by travel of the roller 82 from one cam surface 76 to a next adjacent cam surface 76.

The roller 82 is biased into engagement with the cam 74 by a tension spring 83 connected at one end to the arm 79 and at its opposite end to a bracket 84, secured to and extended upwardly from the body member 59, so that the roller 82 is urged upwardly against the lower portion of the cam 74 as best appears in FIG. 4. The tripping action of the arm 79 (FIG. 2) moves pickup arms 86 into engagement with the sheet material 31 to be removed from the machine 15.

The ratchet 72 is operatively associated with a driving pawl 87 (FIGS. 5 and 7) pivotally mounted on a common pivotal connection 88 for the adjacent ends of a pair of link members 89 and 91. The other end of the link member 89 is pivoted on the shaft 69 while the other end of the link member 91 is pivotally connected at 92 to a drive arm 93 at a position intermediate the ends 94 and 96 of the drive arm. The end 94 of the drive arm 93 is pivotally connected at 95 on the body member 59 while the opposite end 96 of the drive arm 93 is pivotally connected to a pin 97 which joins adjacent links of the sprocket chain 48.

The distance between the pivots 95 and 97 (FIG. 8) of the drive arm is substantially equal to the radius of generation of the arc A—A so that when the pivot 95 is moved into coincidence with the center R the pivot 97 of the drive arm is moved relative to the pivot 95 so as to travel with the chain through the arc A—A without effecting any horizontal movement of the trip carriage 56. In other words during the travel of the arm end 96 over the arc A—A the chain 48 is in a lost motion connection with the trip carriage 56. As a result the motion of the trip carriage 56 is interrupted at the end of its travel toward the bed frame 18 for a predetermined time interval.

During this time interval, and as is best illustrated in FIG. 8, the travel of the end 96 of the drive arm 93 through the arc A—A actuates the link members 89 and 91 to move the pivot connection 88 through an arc providing for the pawl 87 rotating the ratchet 72 through an angle of 90° which corresponds to the pitch of the ratchet teeth 78 and the pitch of the cam surfaces 76. It is seen therefore, that when the trip carriage 56 is at a standstill at the inner end of its travel the cam 74 is rotated to trip the arm 79 through a complete rocking or tripping cycle for a purpose to appear later.

The valve carriage 57 (FIGS. 3 and 6) includes a flat upright elongated body member 98 corresponding in size substantially to the body member 59 of the trip carriage 56. Rollers 63, 64 and 66 similar in construction to the like numbered rollers previously described in connection with the body member 59 are mounted on the body member 98 for operative association with the track or guide members 39 and 41 of the side member 32 in all respects similar to the assembly of the trip carriage 56 with its side member 33.

It is likewise seen that the tie rods 58 are secured to the body member 98 and that the rock shaft 81 is rotatably supported on the body member 98 at positions transversely opposite corresponding positions of such members on the body member 59 of the trip carriage 56. Also the valve carriage 57 and its corresponding drive chain 48 are operatively connected with a drive arm 93 similar in all respects to the drive arm 93 for the trip carriage 56.

The body member 98 of the valve carriage 57 (FIGS. 3 and 6) intermediate the ends and at the upper side thereof carries a control valve unit 99 for regulating the supply of vacuum or subatmospheric air to the tubular pickup arms 86. This valve unit 99 includes a slide valve 101 that is guidably supported between upper and lower guide blocks 102 and 103, respectively, that are secured to the body member 98 by means including a mounting plate 104. On reciprocal movement of the slide valve 101 between end positions therefor subatmospheric air is supplied to and cut off from the pickup arms 86.

The slide valve 101 (FIGS. 6 and 10) is formed in its top side with a longitudinally extended cavity 106. A pair of air connections 107 and 108 secured to the top side of the upper guide block 102 are spaced longitudinally a distance which is less than the length of the cavity 106 and are connectable with the cavity 106 through passages 109 and 111, respectively, formed in the guide block 102.

The connection 107 (FIG. 2) is connected through a line 112, T-connection 113 and a pair of feed lines 114 to the tubular pickup arms 86. These pickup arms 86 are mounted on the rock shaft 81 for movement therewith in response to operation of the trip arm 79 by the combination cam and ratchet unit 68. The other connection 108 is connected through an extensible and retractable coiled tube 116 to a vacuum tank 117 (FIGS. 1 and 2) which constitutes a transverse connecting member between the side members 32 and 33 of the frame structure 26. The tank 117 is comprised of a tubular member closed at its opposite ends and suitably connected with a suction pump (not shown) which may be operated from the drive motor of the printing machine 15.

When the valve 101 is in its position of FIG. 10 the pickup arms 86 are open to atmospheric pressure at the passage 109 corresponding to the air connection 107. On movement of the valve 101 to its position shown in FIG. 11 the passages 109 and 111 are in fluid registration with the cavity 106 which with the lower side of the guide block 102 forms a connecting passage therebetween whereby a vacuum or subatmospheric air is applied to the ends of the pickup arms 86.

In the operation of the pickup apparatus 16 of this invention assume that the valve carriage 57 and trip carriage 56 are in their positions shown in FIGS. 3 and 4, respectively, wherein both carriages are at the outer ends of their travel and ready for movement toward the inner end of the frame structure 26. In this position for the valve carriage 57 the valve 101 of the valve unit 99 is in its position shown in FIG. 10 wherein the pickup arms 86 are open to the atmosphere. Likewise in the corresponding position for the trip carriage 56 shown in FIG. 4 the roller 82 for the trip arm 79 is engaged with a cam surface 76 at the lower side of the cam 74 where it is maintained by the action of the tension springs 83. It will further be seen that the pawl 87 is at one end of a tooth segment 78.

These relative positions of the parts on the valve carriage 57 and trip carriage 56 remain unchanged during the travel of the carriage assemblies toward the inner end of the frame structure 26 until the pivot connections 95 for the arm ends 94 approach coincidence with the center R which defines the radius of curvature for the arc A—A. As the drive arm connection 95 for the valve carriage 57 approaches coincidence with center R an extension 118 (FIG. 3) on the valve 101 engages an adjustable bumper or stop 119 on the frame structure 26 whereby the valve 101 is moved from its vacuum cut-off position of FIG. 10 to its vacuum supply position of FIG. 11.

Vacuum or subatmospheric air is thus applied to the pickup arms 86 prior to the interrupted or stalled movement of the carriage assemblies 56 and 57 at the inner end of their travels on the frame structure 26. Importantly, vacuum is applied to the pickup arms 86 before the arm 79 is tripped to oscillate the rock shaft 81. As a result ample time is provided to clear the arms 86 and their fluid connections with the storage tank 117 of atmospheric air prior to actual engagement of the suction cups or fingers 121 at the ends of the arms 86 with the sheet material 31 to be picked up. A full vacuum is thus applied to the pickup fingers or cups 121 to assure a positive pickup action on the sheet 31.

On coincidence of the pivotal connection 95 of the drive arm 93 for the trip carriage 56 with the center R for the arc A—A the pawl 87 begins movement out of engagement with a previously engaged tooth segment 78 and for working engagement with a next following tooth segment. During this lost motion movement of the pawl 87 into working engagement with the next following tooth segment 78 no rotational movement of the combination cam and ratchet unit 68 takes place. However on upward movement of the end 96 of the drive arm 93 through the arc A—A the pawl 87 drives the engaged tooth segment 78 through an angular distance of 90° corresponding to the pitch of the cam surfaces 76.

As a result of this rotation of the combination unit 68 the rock arm 79 is tripped through a complete cycle whereby to oscillate the rock shaft 81. From a consideration of FIG. 4 is it seen that the rocking movement of the shaft 81 is in direct proportion to the translatory linear movement of the roller 82 through a radial distance equal to the depth of a notch 77. The pickup arms 86 (FIGS. 6 and 12) when the roller 82 is engaged with a cam surface 76 are extended substantially horizontally at a position above the rock shaft 81. Likewise as shown best in FIG. 12 the sheet material 31 is horizontally supported on the bed frame 18 at a position just below the level of the rock shaft 81. By virtue of this relative arrangement it is seen that the pickup fingers 121 at the end of the arms 86 move through an upright arc that approaches a linear path of travel.

Thus while the carriage assemblies 56 and 57 are without horizontal movement at the inner ends of their travel and with full vacuum appplied to the pickup arms 86 the pickup fingers 121 are vertically moved through a substantially linear path into suction engagement with the sheet material 31 on the bed frame 18 and then moved upwardly from the bed frame 18 prior to any movement of the carriages 56 and 57 toward the outer end of the frame structure 26.

With the sheet material 31 suspended from the pickup fingers 121 the carriage assemblies 56 and 57 are moved to their positions shown in FIGS. 3 and 4, respectively. As the valve carriage 57 approaches its position in FIG. 3 an extension 123 on the valve 101 is engaged by a stop or bumper 124 on the frame structure 26 whereby the valve 101 is moved from its position in FIG. 11 to its position shown in FIG. 10 in which the connection 107 is opened to the atmosphere. On this cut-off of vacuum to the pickup fingers 121 the sheet material 31 is released from the fingers 121 and dropped into the storage position on the intermediate platform 28 shown in FIGS. 1 and 12. The cycle of the pickup apparatus 16 is then repeated.

The transmission system for the pickup apparatus is schematically shown in FIG. 13 with a drive motor being indicated at 129. The drive shaft of the motor 129 is connected through a sprocket and chain assembly 131 in a driving relation with a shaft 132 provided with sprockets 133 at the opposite ends thereof. Each sprocket 133 is in a driving relation with a sprocket 134 mounted on a shaft 136 that is common to the gears 47. It is seen therefore that the chains 48 are driven from a common drive so as to be operable without any relative slippage.

It is to be understood of course that the operation of the pickup apparatus 16 is in a timed and synchronized relation with the operation of the printing press 15 so that the chase 22 is moved upwardly from the bed frame 18 during the time interval required for the pickup arms 86 to pass between the frame 18 and chase 22 during their pickup function relative to the sheet material 31. It will be further understood of course that the chase 22 is in its upper position during the replacement of a sheet of material 31 in the machine 15.

Although the pickup apparatus of this invention has been described relative to a preferred embodiment thereof it is to be understood that it is not to be so limited since changes and modifications can be made therein which

I claim:

1. In a screen printing press having a bed frame for holding a sheet material to be printed upon and a screen supporting frame movably mounted on said bed frame for up and down movement toward and away from said bed frame, a material pickup apparatus for automatically removing the material from said bed frame after being printed upon comprising:
   (a) a frame structure extended laterally from one side of said bed frame,
   (b) a vacuum pickup means movably supported on said frame structure for horizontal reciprocal movement between a first position between said bed frame and screen supporting frame, when said supporting frame is moved away from said bed frame, and to a second position adjacent the outer end of said frame structure,
   (c) means for holding the pickup means in said first position for a predetermined time interval,
   (d) means for linearly moving said pickup means vertically into engagement with the printed material during said time interval, and
   (e) means for supplying a subatmospheric pressure to the pickup means during said predetermined time interval and for releasing said pressure when the pickup means is in the second position therefor.

2. For use with a screen printing press having a bed frame for holding material to be printed upon and a screen supporting frame movably mounted on said bed frame for up and down movement toward and away from said bed frame, a material handling mechanism for picking up printed material from the bed frame and delivering the printed material to a storage location comprising:
   (a) an elongated frame structure extending laterally from said bed frame, said storage location being on said frame structure adjacent the outer end thereof,
   (b) a vacuum material pickup means including a carriage assembly movably supported on said frame structure for horizontal movement between the ends thereof and a pickup portion projected from said carriage assembly toward said bed frame,
   (c) a continuously operated sprocket and chain assembly mounted on said frame structure for moving said pickup means to a first position wherein the pickup portion is between said bed frame and said screen supporting frame, when said screen supporting frame is moved upwardly, and to a second position wherein said pickup portion is above said storage location,
   (d) means providing a lost motion connection between said carriage assembly and the sprocket and chain assembly when the pickup portion is in said first position therefor whereby to maintain said pickup portion against horizontal movement for a predetermined time interval,
   (e) coacting means on said carriage assembly and chain and sprocket assembly for vertically moving the pickup portion into and from a material pickup position therefor when the pickup means is in the first position therefor, and
   (f) means for maintaining a subatmospheric pressure on the pickup means during said time interval and movement of the pickup means from said first position to said second position.

3. The invention according to claim 2 wherein said coacting means comprises:
   (a) a drive arm pivotally connected to said carriage assembly and to said chain and sprocket assembly,
   (b) a ratchet and cam unit on said carriage assembly operatively associated with said pickup means to actuate the pickup means into and from the material pickup position, and
   (c) a driving pawl for said unit mounted on said drive arm.

4. The invention according to claim 2 wherein the lost motion means comprises:
   (a) a drive arm pivotally connected to and extended between said carriage assembly and the chain of the chain and sprocket assembly, and
   (b) a chain guide means at the end of said frame structure adjacent said bed frame defining an arcuate path of travel for said chain having a radius substantially equal to the length of said drive arm with a center substantially coincident with the axis of the pivotal connection of the drive arm with said carriage assembly when the pickup means is in the first position therefor.

References Cited by the Examiner

UNITED STATES PATENTS

| | | | |
|---|---|---|---|
| 2,669,455 | 2/1954 | Hory | 271—74 |
| 2,828,127 | 3/1958 | Joel | 271—74 |
| 2,936,705 | 5/1960 | Hall | 101—123 |
| 3,053,529 | 9/1962 | Dunn | 271—11 |

EVON C. BLUNK, *Primary Examiner.*

A. C. HODGSON, *Assistant Examiner.*